Aug. 31, 1937.    W. S. HARLEY    2,091,682
INSTRUMENT MOUNTING FOR MOTORCYCLES
Filed May 16, 1936    2 Sheets-Sheet 1

INVENTOR
William S. Harley
BY
Wheeler, Wheeler + Wheeler
ATTORNEYS

Aug. 31, 1937.  W. S. HARLEY  2,091,682
INSTRUMENT MOUNTING FOR MOTORCYCLES
Filed May 16, 1936  2 Sheets-Sheet 2
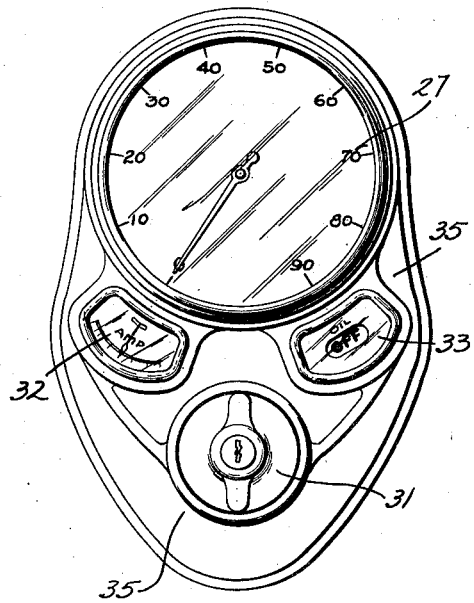
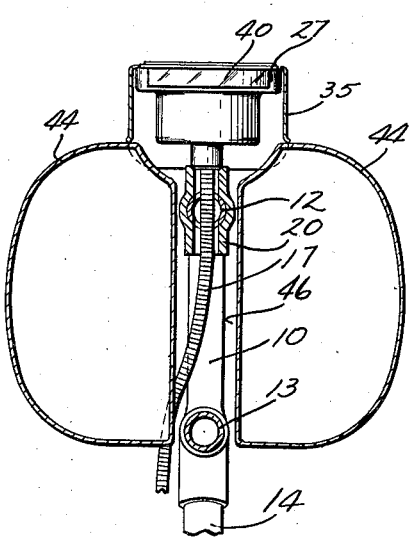
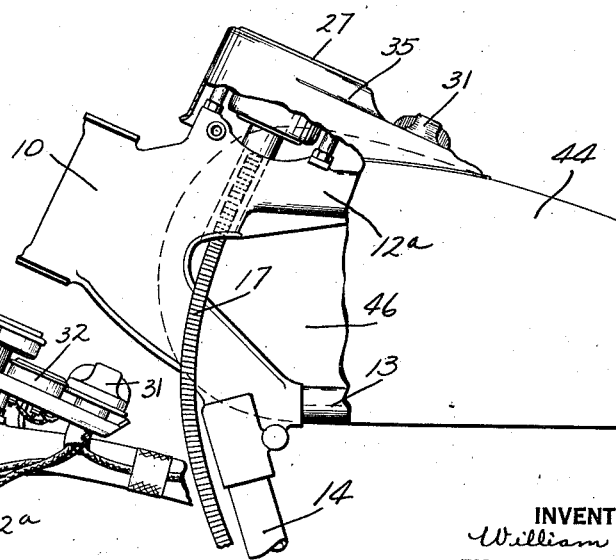
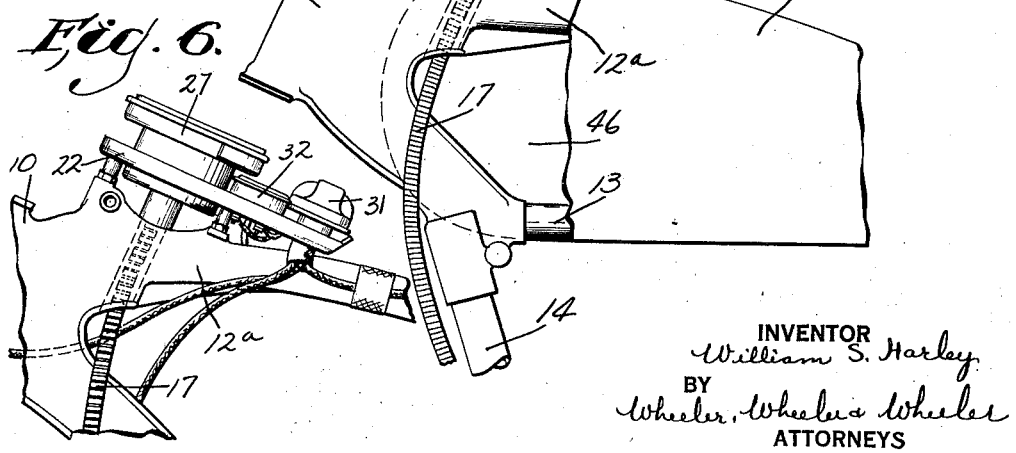
INVENTOR
William S. Harley
BY
Wheeler, Wheeler & Wheeler
ATTORNEYS Patented Aug. 31, 1937

2,091,682

UNITED STATES PATENT OFFICE 2,091,682

INSTRUMENT MOUNTING FOR MOTOR-CYCLES

William S. Harley, Milwaukee, Wis., assignor to Harley-Davidson Motor Co., Milwaukee, Wis., a corporation of Wisconsin Application May 16, 1936, Serial No. 80,035

3 Claims. (Cl. 208—45)

My invention relates to improvements in instrument mountings for motorcycles, including mountings for speedometers, ignition switches, ammeters, oil gages, etc.

My object is to provide a motorcycle with a conveniently located instrument panel or mounting which, with its connections, may be so associated with the frame as to protect the wiring and speedometer cable from entanglement, prevent them from interfering with the free removal, repair, and replacement of gasoline tanks and other parts, and allow the panel with its wiring and cable to remain permanently attached to the frame undisturbed by such repairs and replacements.

Further objects are to provide a motor-cycle with a special frame bar member which will support an instrument panel in the most available position for inspection of the instrument; which will provide a guide or holder for a speedometer cable; which will reenforce the associated portions of the frame.

In the drawings:

Figure 3 is a plan view of the panel or so-called instrument board.

Figure 4 is a sectional view drawn to line 4—4 of Figure 1.

Figure 5 is a view similar to Figure 1 showing a modification.

Figure 6 is a perspective view of the panel and associated parts, with the gasoline tanks removed.

Like parts are identified by the same reference characters throughout the several views.

Figure 2:
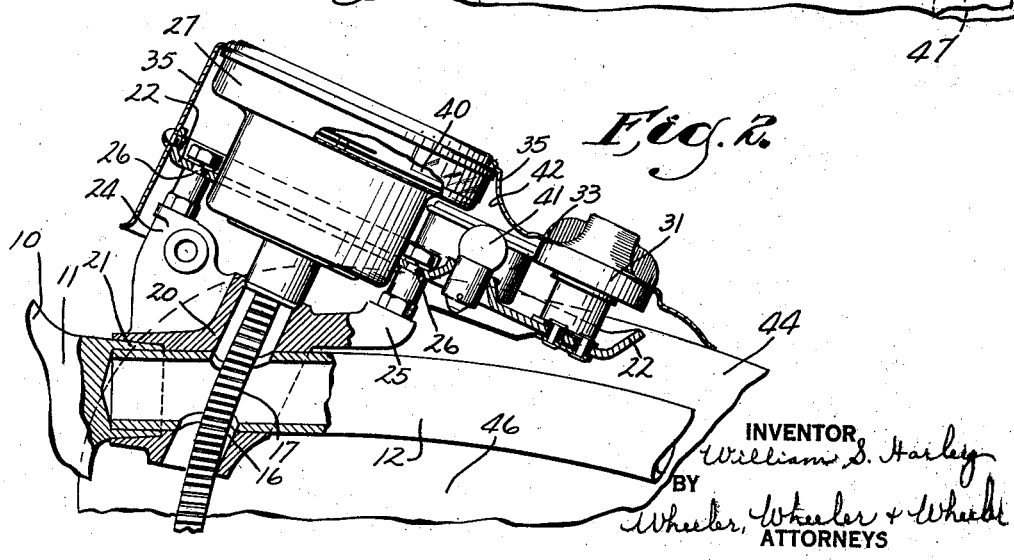
Figure 2 is an enlarged view, partly in section and partly in elevation, of my improved mounting and associated parts.

The steering head 10, depending arm 11, and associated frame bars 12, 13 and 14, may be assumed to be parts of a motorcycle frame of ordinary construction, except that the upper frame bar 12 is provided with an aperture at 16 through which a speedometer cable 17 may pass. In Figure 2 the frame bar 12 is tubular in form, and a forged reenforcing jacket 20 encases the front end of the bar and the associated stud projection 21 on the arm 11.

This jacket 20 is also apertured to allow the speedometer cable to pass through it, and its upper portion serves as a mounting for an instrument panel 22 which is secured to the arms 24 and 25 of the mounting by bolts 26. This instrument panel 22 supports a speedometer casing 27, a switch 31, an ammeter 32, and an oil gage 33, these instruments being symmetrically arranged with the speedometer casing 27 in a forward position.

The panel is preferably ovate in outline, with its longer axis directly above the axis of the tube 12. The axes of the speedometer casing and the switch preferably coincide substantially with a vertical plane which includes the axis of the frame bar 12.

A cap member 35 covers the instruments and is provided with windows through which the instruments may be viewed. These windows are preferably circular in form and have disks of glass or other transparent instrument protecting material.

The speedometer casing 27 is provided with an arcuate slot 40 at the rear side, which is also covered with transparent material, whereby the rays of light from a lamp 41 may be distributed over the surface of the dial by means of a reflector 42 adapted to direct the rays into the casing 27 through slot 40. The reflector 42 may comprise a polished portion of the interior surface of the cap, and is adapted, by reason of its convex curvature, to distribute rays of light which it directs through the slot 40 in such a manner that the entire surface of the dial is illuminated.

In the modern motorcycle it is common to employ a pair of fuel tanks or tank members 44 which are located on opposite sides of the space 46 directly underneath the frame bar 12 in the vicinity of the head 10. I utilize this space by extending a flexible driving shaft or so-called speedometer cable 17 from the transmission mechanism in box 47 upwardly between the tank members 44 and through the aperture 16 to the speed indicator in casing 27. The upper end portion of the speedometer cable is thus protected, and the rider may also be protected from contact with it or with any other connections leading to the instruments on the panel through the space partially occupied by the cable.

Figure 1:
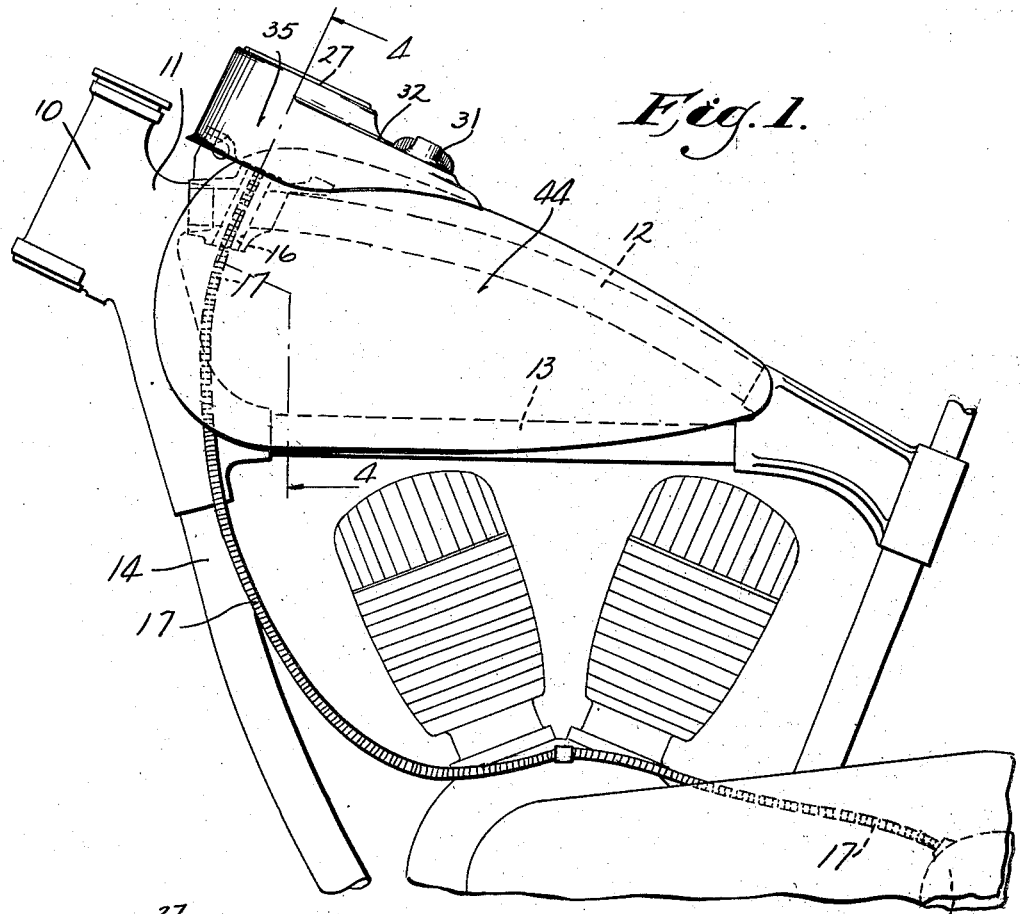
Figure 1 is a side elevation of a fragment of the front end of a motorcycle frame in which my invention has been embodied.

My invention may be embodied in motorcycles having frames of various types. In Figure 1 it may be assumed that the steering head 10 and arm 11 consist of a unitary forging. The jacket 20 is illustrated as a separate forging, through which the top frame bar tube 12 may pass to its connection with the stud 21 on the arm 11. But in Figure 5 I have illustrated a modification in which the upper frame bar 12a is forged, in whole or in part, and made to serve also as a mounting for the instrument panel, thus dispensing with the jacket 20.

The materials employed, and the form of the frame members are not essential to the invention herein claimed, and it is not essential that the speedometer cable be extended through an apertured top frame bar if the form of the fuel tank members, and of said top bar, is such as to otherwise provide space for the cable to pass to its connection with the speed indicator.

In Figure 6 I have illustrated my improved mounting and associated parts of the motorcycle frame with the fuel tanks removed. The wires or cords may extend around the member 20 to and through the panel, as shown in Figure 2, but it is not essential to my invention whether they are extended around the member 20 or through the aperture 16, since in either case they may remain permanently in place and are protected from breakage or entanglement.

I claim:
1. The combination with the top bar of a motorcycle frame, of an instrument panel mounted on said bar, and a speedometer cable extending through said panel from space underneath said top bar, the bar having a reinforced apertured portion through which said cable extends.
2. In a motorcycle, the combination with a top bar having an aperture for a speedometer cable, and a reinforcing jacket for the apertured portion of said top bar.
3. In a motorcycle, the combination with a top bar having an aperture for a speedometer cable, a reinforcing jacket for the apertured portion of said top bar, and a forged steering head having an arm with which said top bar and jacket are connected.

WILLIAM S. HARLEY.